US011058123B2

(12) United States Patent
Michelsen et al.

(10) Patent No.: US 11,058,123 B2
(45) Date of Patent: Jul. 13, 2021

(54) FOOD DOUGH EXTRUSION MACHINE

(71) Applicant: HAAS FOOD EQUIPMENT GMBH, Leobendorf (AT)

(72) Inventors: Freddy Verner Michelsen, Åstorp (SE); Stefan Jiraschek, Königsbrunn (AT); Mogens Petersson, Niva (DK)

(73) Assignee: HAAS FOOD EQUIPMENT GMBH, Leobendorf (AT)

( * ) Notice: Subject to any disclaimer, the term of this patent is extended or adjusted under 35 U.S.C. 154(b) by 0 days.

(21) Appl. No.: 16/333,224

(22) PCT Filed: Sep. 14, 2017

(86) PCT No.: PCT/AT2017/060233
§ 371 (c)(1),
(2) Date: Mar. 13, 2019

(87) PCT Pub. No.: WO2018/049458
PCT Pub. Date: Mar. 22, 2018

(65) Prior Publication Data
US 2019/0223454 A1 Jul. 25, 2019

(30) Foreign Application Priority Data
Sep. 16, 2016 (DE) .......................... 102016011125.9

(51) Int. Cl.
*A21C 11/16* (2006.01)
*A21C 3/04* (2006.01)
*A23P 30/25* (2016.01)

(52) U.S. Cl.
CPC .............. *A21C 11/163* (2013.01); *A21C 3/04* (2013.01); *A23P 30/25* (2016.08)

(58) Field of Classification Search
CPC ........... A21C 11/16; A21C 3/025; A21C 3/04; A21C 9/08; A21C 3/02; A21C 11/163
See application file for complete search history.

(56) References Cited

U.S. PATENT DOCUMENTS 3,213,808 A    10/1965   Schafer
4,120,627 A * 10/1978   Abe ........................ A23G 3/02
                                                                                  425/101

(Continued)

FOREIGN PATENT DOCUMENTS

CN        205284828 U    6/2016
DE        69328155 T2    9/2000

(Continued)

OTHER PUBLICATIONS

International Search Report and Written Opinion of International Application No. PCT/AT2017/060233 dated Dec. 12, 2017.

(Continued)

*Primary Examiner* — Nahida Sultana
(74) *Attorney, Agent, or Firm* — Gordon & Jacobson, P.C.

(57) ABSTRACT

A dough extrusion machine (10). The machine has a first extrusion unit (1) and a second extrusion unit (2) mounted to a platform (3), wherein the first extrusion unit (1) comprises combining means (12) for combining dough discharged from the first extrusion unit (1) and dough discharged from the second extrusion unit (2), characterized in that the first extrusion unit (1) has a plurality of inlet openings (7) upstream of combining means (12), and that the second extrusion unit (2) has a plurality of outlet openings (4), wherein the outlet openings (4) of the second extrusion unit (2) are coupled to the inlet openings (7) of the first extrusion unit (1) by an array (5) of tubes (6) detachably mounted to the first and second extrusion unit (1, 2).

30 Claims, 7 Drawing Sheets

(56) References Cited

U.S. PATENT DOCUMENTS

| | | | |
|---|---|---|---|
| 4,398,881 A | | 8/1983 | Kobayashi |
| 4,416,910 A | | 11/1983 | Hayashi et al. |
| 4,715,803 A | * | 12/1987 | Koppa ............... A21C 3/04 |
| | | | 425/133.1 |
| 4,888,192 A | * | 12/1989 | Ramnarine ......... A21C 3/04 |
| | | | 426/448 |
| 5,333,538 A | * | 8/1994 | Sawa .................. B29C 48/304 |
| | | | 99/353 |
| 5,766,663 A | * | 6/1998 | Neumann ............ A21C 3/08 |
| | | | 425/323 |
| 6,062,273 A | * | 5/2000 | Peeters .............. D03D 47/3053 |
| | | | 139/435.2 |
| 2016/0113293 A1 | * | 4/2016 | Zaleski, Jr. ......... B29C 48/301 |
| | | | 425/464 |

FOREIGN PATENT DOCUMENTS

| | | |
|---|---|---|
| DE | 10342820 A1 | 5/2005 |
| EP | 0359393 A1 | 3/1990 |
| EP | 0443849 A1 | 8/1991 |
| EP | 2514328 B1 | 6/2016 |
| KR | 20120079296 A | 7/2012 |
| KR | 20150117231 A | 10/2015 |

OTHER PUBLICATIONS

IN Examination Report dated Mar. 3, 2021 of Application No. 201947014597.

* cited by examiner

FOOD DOUGH EXTRUSION MACHINE

CROSS-REFERENCE TO RELATED APPLICATION(S)

This application is the National Stage of International Patent Application No. PCT/AT2017/060233 filed on Sep. 14, 2017, which claims priority from German Patent Application No. DE 102016011125.9 filed on Sep. 16, 2016, both of which are hereby incorporated by reference herein in their entireties.

BACKGROUND

1. Field of the Invention

The invention relates to a food dough extrusion machine.

2. State of the Art

U.S. Pat. No. 4,398,881 discloses an apparatus for forming soft and sticky food material. The embodiment of FIG. 5 shows a first and a second supply means connected with each other. A single pipe extends from the second supply means to a separate diverging chamber and from there to diverging pipes. The diverging chamber and the diverging pipes are integrally formed with the first supply means. The disadvantages of such a machine particularly consists in an adverse, i.e. not uniform dough distribution in the diverging chamber. Peripheral diverging pipes have a different flow rate than the central diverging pipe that directly faces the opening of the single pipe. Further the cleaning of the diverging chamber and the diverging pipes is very difficult, since they are integrally formed with the first supply means.

EP0359393B1 discloses an apparatus for forming soft food material into globular shape. FIG. 1 shows the co-extrusion of a first and a second food material. The construction is very space consuming and has a separate combining means arranged centrally between the material supplying units.

EP0443849B1 discloses a marble-pattern edible filling delivery apparatus comprising a plurality of supply pipes for supplying a plurality of filling materials. Construction, assembling and cleaning of the channels is very difficult, time consuming and costly.

EP2514328B1 discloses an apparatus for extruding flowable food masses having filling flow dividers and a nozzle block arranged between the flow dividers. Due to the very inflexible construction cleaning and servicing becomes very complex and expensive.

DE10342820B4 discloses a food shaping device for forming a three-layered food. The device comprises hopper-shaped dough receiving units and a food output unit. The food output unit comprises a main tube, a middle tube and an inner tube.

DE69328155T2 discloses a method and an apparatus for forming a plastic food having at least one constriction therein. The apparatus comprises three extruders with built-in gear pumps. From each extruder a supply passages extends towards a nozzle arrangement.

SUMMARY

Accordingly, it is an object of the invention to provide an improved dough extrusion machine for the food industry. In particular, the dough extrusion machine shall allow for high flexibility as well as for simple cleaning of parts coming into contact with dough. Furthermore, the construction of the extrusion machine shall be simplified such that assembling and servicing can be performed at lower costs and in shorter time.

The problem of the invention is solved by a dough extrusion machine comprising a first extrusion unit and a second extrusion unit mounted to a platform where the first extrusion unit comprises combining means for combining dough discharged from the first extrusion unit and dough discharged from the second extrusion unit, where the first extrusion unit has a plurality of inlet openings upstream of combining means, and the second extrusion unit has a plurality of outlet openings, wherein the outlet openings of the second extrusion unit are coupled to the inlet openings of the first extrusion unit by an array of tubes detachably mounted to the first and second extrusion unit.

The array of tubes is detachable from both, the first extrusion unit and the second extrusion unit. In the mounted state of the tube array each tube connects an outlet opening of the second extrusion unit with an inlet opening of the first extrusion unit. In the demounted state of the tube array the outlet openings (of the second extrusion unit) and the inlet openings (of the first extrusion unit) are accessible, e.g. for cleaning and/or maintenance purposes.

The invention facilitates cleaning and maintenance of the extrusion machine. The inventive extruder complies with high hygienic standards. The tubes may be cleaned at a location apart from the extrusion units. By removing the tube array access is given to the openings in the extrusion units. Moreover, the system is very flexible, since it is possible to use only one of the extrusion units or both extrusion units separately or both extrusion units in a co-extrusion arrangement, i.e. with the tube array connecting the openings of the extrusion units. In the mounted state of the tube array (i.e. in the co-extrusion arrangement) the end openings of the tubes lie against the outlet openings of the second extrusion unit and against the inlet openings of the first extrusion unit, respectively.

The extrusion unit has a plurality of outlet nozzles through which the combined dough flow (co-extruded dough) is discharged, e.g. onto a conveyor. The outlet nozzles may be a part of the combining means. Each outlet opening of the second extrusion unit is coupled to a separate outlet nozzle. I.e. the plurality of individual dough flows passing the tube array are kept separated (are not mixed together anymore). A further advantage of the invention consists in the fact that the dough extrusion machine yields a very high weight accuracy across the machine, i.e. in the direction along which the outlet nozzles (discharge nozzles) are arranged. Bakery products of high and reproducible quality may be produced in this way.

Each of the extrusion units may further comprise a hopper or any other suitable dough supplying means. It is preferred that each of the extrusion units comprises two feeding rollers forming a gap for transferring the dough towards the outlet nozzles. Downstream of the feeding rollers and upstream of the outlet nozzles the extrusion units may comprise a pump housing (e.g. comprising structured rolls) or a filler block.

The extrusion machine may comprise a conveyor for transporting dough extruded by the extrusion units. It is preferred that the extrusion units have longitudinal extension and extend transverse to the transporting direction of the conveyor. The outlet openings of the second extrusion unit, the inlets of the first extrusion unit and the dough outlet nozzles for discharging the combined dough flow (co-extrusion) are arranged along the longitudinal direction of the extrusion units.

The invention relates to a food dough extrusion machine, particularly for producing bakery products, such as biscuits, cookies, crackers, etc. The term "dough" has a broad meaning within the sense of the present application and comprises any flowable food masses or kneaded food material, including fillings, creams, paste-like material, and may contain cereals (particularly wheat), sugar, salt, milk, eggs, bakery improvers, chocolate, nougat, nuts and/or other ingredients.

Platform may be any kind of support supporting the extrusion units, particularly a table, a frame, a base, etc., preferably with an integrated conveyor for transporting extruded dough.

Preferably, the outlet openings of the second extrusion unit are formed within a block which is directly attached to or integrally formed with the housing in which the feed rollers of the second extrusion unit are accommodated.

It is of course possible to have a third extrusion unit which is also connected by a tube array to the first extrusion unit. In that case outlet openings of the third extrusion unit are connected by the tubes with corresponding inlet openings of the first extrusion unit.

In a preferred embodiment the array of tubes is formed from at least two separate segments, wherein each segment comprises at least one tube and wherein each segment is detachable from the first and second extrusion unit independently of the other segment(s). The machine becomes more flexible, because the weight of each segment is lower than the whole tube array. The tube array can be mounted and demounted in simple steps, e.g. by an operator without the need of auxiliary means.

In a preferred embodiment a segment comprises at least two, preferably at least three, tubes interconnected with each other, preferably at their ends. In such a way mechanically stable segments are provided. Moreover, this embodiment allows for ease positioning of the segments.

In a preferred embodiment the tubes are connected to one of the extrusion units, preferably the first extrusion unit, via at least one hinge, wherein preferably the axis of the hinge is essentially perpendicular to the longitudinal extension of the tubes. The step of mounting the tubes—individually or in form of segments (grouped) or in form of an array—is simplified. A tilting movement of the tube(s) around the hinge axis allows an accurate and defined positioning of the tube(s) relative to the extrusion unit and to the openings of the extrusion unit. The hinge is preferably formed by two hinge parts, wherein one hinge part is formed on the extrusion unit and the other hinge part is formed on the tube array (on individual tubes or on a tube segment). The hinge parts are detachable from each other in at least one tilting position.

In a preferred embodiment the tubes are connected to one of the extrusion units, preferably the second extrusion unit, via at least one fastening mechanism, preferably a clamping mechanism and/or a fastening screw, having an integral handle, preferably in form of a turnable lever. This allows the operator to remove the tubes without auxiliary tools. It is preferred that, in the mounted state of the tubes, the handle(s) is/are accessible laterally from the second extrusion unit. With other words: the handle(s) is/are arranged on a side of the second extrusion unit facing away from the first extrusion unit.

In a preferred embodiment the first extrusion unit and/or the second extrusion unit comprise(s) at least one notch supporting the tubes. The notch has the function of positioning the tubes as well as fastening the tubes.

In a preferred embodiment the array of tubes comprises sealing rings, wherein a sealing ring encloses at least one, preferably at least two tube openings. The tube array thus has also the function of reliably sealing the transfer from the openings in the extrusion units to the openings in the tube array.

In a preferred embodiment the array of tubes comprises at least one positioning means, preferably a positioning pin or positioning recess, cooperating with a positioning structure formed on the first extrusion unit and/or the second extrusion unit. This allows for ease assembling and correct overlap of the openings.

In an embodiment of the invention the length of the tubes is at least 5 times, preferably at least 8 times, larger than the vertical distance between the outlet openings of the second extrusion unit and the inlet openings of the first extrusion unit. This embodiment is preferred since the extrusion units may be placed on the same or nearly same vertical level and also in a side-by-side arrangement. They may be mounted to the same portion of the platform and used also in a single-extrusion arrangement, i.e. with detached tube array.

In a preferred embodiment the array of tubes is arranged between the extrusion units and a conveyor transporting co-extruded dough away from the extrusion units.

In a preferred embodiment the tubes extend parallel to each other, preferably essentially horizontally, allowing a space saving design. Preferably, the tubes have a straight run, such that the axis of the tubes lie within a single plane.

In a preferred embodiment the end openings of the tubes facing the outlet openings of the second extrusion unit extend within a plane which is transverse, preferably essentially perpendicular, to the plane in which the end openings of the tubes facing the inlet openings of the first extrusion unit extend.

In a preferred embodiment each tube has in at least one of its end regions, preferably in its end region facing the second extrusion unit, a removable insert defining a bent of the dough path. The tube may be cleaned very easily, when the insert has been removed. The insert may be fixed within the tube by means of a fixing element, preferably a plate.

In a preferred embodiment the first extrusion unit comprises two feeding rollers, wherein combining means is arranged vertically below the gap formed between the feeding rollers of the first extrusion unit.

It is preferred if the combining means is formed within a block which directly attached to or integrally formed with the housing in which the feeding rollers are accommodated.

In a preferred embodiment the second extrusion unit comprises two feeding rollers, wherein the outlet openings of the second extrusion unit are arranged vertically below the gap formed between the feeding rollers of the second extrusion unit.

It is preferred if the outlet openings (of the second extrusion unit) are formed within an outlet block which is directly attached to or integrally formed with the housing in which the feeding rollers (of the second extrusion unit) are accommodated. In such a way the path of the dough is shortened and friction is reduced.

In a preferred embodiment combining means is integrally formed within the first extrusion unit.

The combining means may be formed within a—preferably detachable—combining block. The combining block may comprise the inlet openings (which are connected by the tube array with the outlet openings of the second extrusion unit), connection openings to the dough space of the first extrusion unit (housing in which also the feeding rollers are accommodated) and a combining passage or combining nozzle in which the different dough flows are brought together. The combined dough flow leaves the extruder through a plurality of nozzles formed in the combining block.

In a preferred embodiment the first extrusion unit and the second extrusion unit may be separately demounted from the platform. This allows high flexibility and ease installation. The tube array may be mounted after the extrusion units are brought into correct place.

In a preferred embodiment each extrusion unit comprises at least two feeding rollers forming a gap in between and wherein the outlets of each extrusion unit are arranged along a direction that is parallel to the rotational axes of the feeding rollers.

In a preferred embodiment first ends of the tubes are pressed against the first extrusion unit and the second ends of the tubes are pressed against the second extrusion unit, allowing for a tight connection.

In a preferred embodiment the tubes may have a curved run. This embodiment is advantageous for connecting different height levels and/or realizing a place-saving design.

In an embodiment the tubes may be flexible (i.e. the run of the tubes may be changed), e.g. in order to account for relative adjustments/movements between first and second extrusion unit. The tubes may be also at least partially transparent.

The plurality of inlet openings of the first extrusion unit and the plurality of outlet openings of the second extrusion unit may be arranged at different height levels, wherein preferably the plurality of outlet openings of the second extrusion unit are arranged on a higher level than the plurality of inlet openings of the first extrusion unit.

Preferably, the distance between neighbouring inlet openings of the plurality of inlet openings of the first extrusion unit is different to, preferably larger than, the distance between neighbouring outlet openings of the plurality of outlet openings of the second extrusion unit. Here, extrusion units of different size (longitudinal extension) may be used.

In an embodiment the second extrusion unit is mounted to the first extrusion unit. The second extrusion unit may be also movably mounted relative to the first extrusion unit.

The problem is also solved by a method of producing bakery products with a dough extrusion machine according to the invention, wherein preferably the dough supplied to the first extrusion unit has a higher density and/or viscosity than the dough supplied to the second extrusion unit. With the first extrusion unit the dough path is much shorter than from the second extrusion unit and through the tube array. Therefore, the friction for heavy dough is kept low, while for softer dough of lower weight friction does not constitute a problem.

BRIEF DESCRIPTION OF THE DRAWINGS

For a better understanding of the invention the latter is explained in more detail with reference to the following Figures.

DETAILED DESCRIPTION

Generally, the same parts or similar parts are denoted with the same/similar names and reference signs. The features disclosed in the description apply to parts with the same/similar names respectively reference signs. Indicating the orientation and relative position (up, down, sideward, etc.) is related to the associated Figure, and indication of the orientation and/or relative position has to be amended in different Figures accordingly as the case may be.

Figure 1:
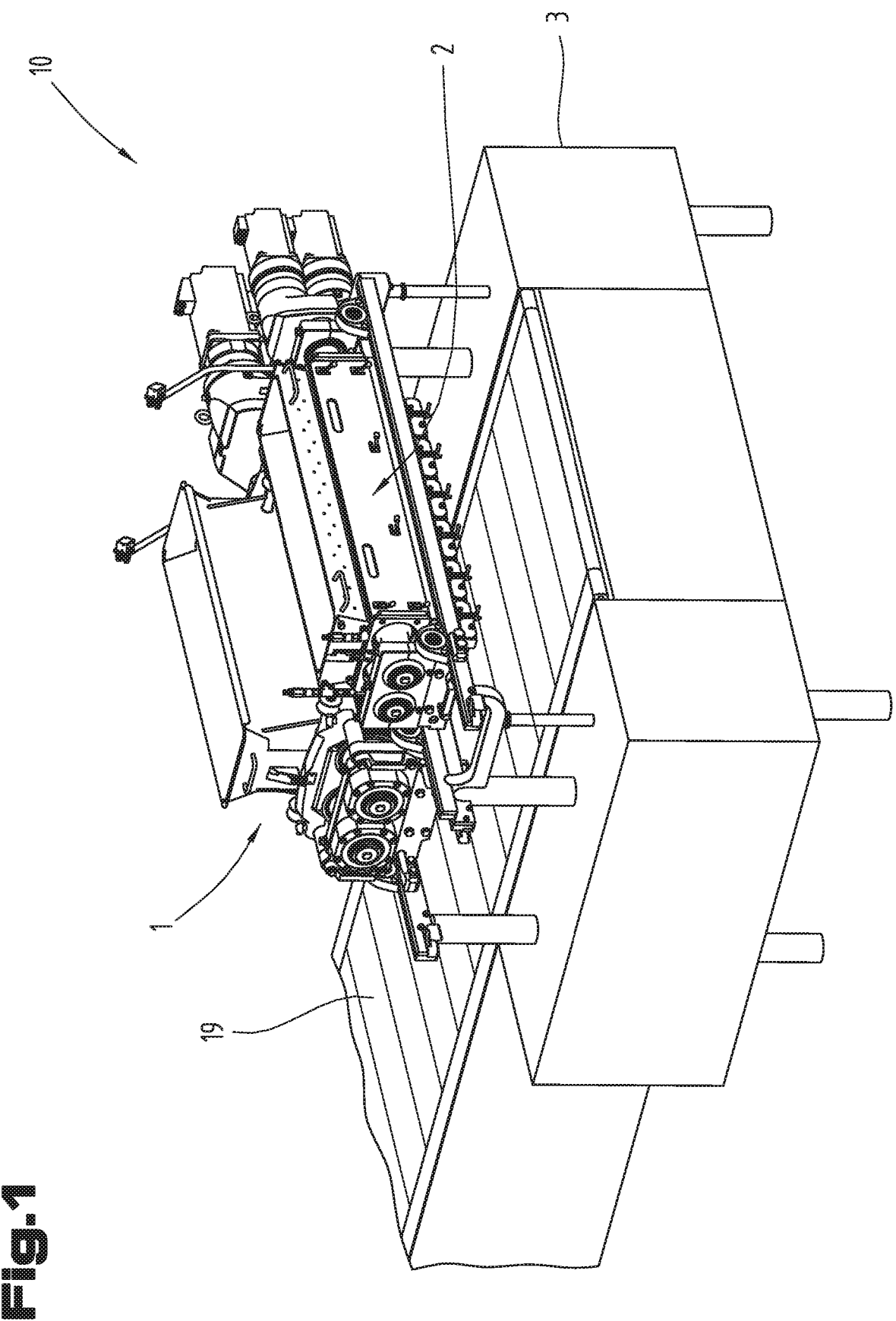
FIG. 1 shows a dough extrusion machine comprising two extrusion units.

FIG. 1 shows a dough extrusion machine 10 comprising a first extrusion unit 1 and a second extrusion unit 2 mounted to a common platform 3. As can be seen from FIG. 2 the first extrusion unit 1 comprises combining means 12 for combining dough discharged from the first extrusion unit 1 and dough discharged from the second extrusion unit 2.

The extrusion unit has a plurality of outlet nozzles 20 through which the combined dough flow (co-extruded dough) is discharged, e.g. onto the conveyor 19. The outlet nozzles 20 may be a part of the combining means 12. The first extrusion unit 1 comprises two feeding rollers 17 forming a gap for feeding dough towards the outlet nozzles 20 (at the end of combining means 12). Combining means 12 is arranged vertically below the gap formed between the feeding rollers 17 and integrally formed within the first extrusion unit 1. Combining means 12 is formed within a block which is directly attached to or integrally formed with the housing in which the feeding rollers are accommodated.

The second extrusion unit 2 comprises also two feeding rollers 18, wherein the outlet openings 4 of the second extrusion unit 2 are arranged vertically below the gap formed between the feeding rollers 18 of the second extrusion unit 2. The outlet openings 4 of the second extrusion unit 1 are formed within a block which is directly attached to or integrally formed with the housing in which the feed rollers 18 of the second extrusion unit 2 are accommodated.

Figure 2:
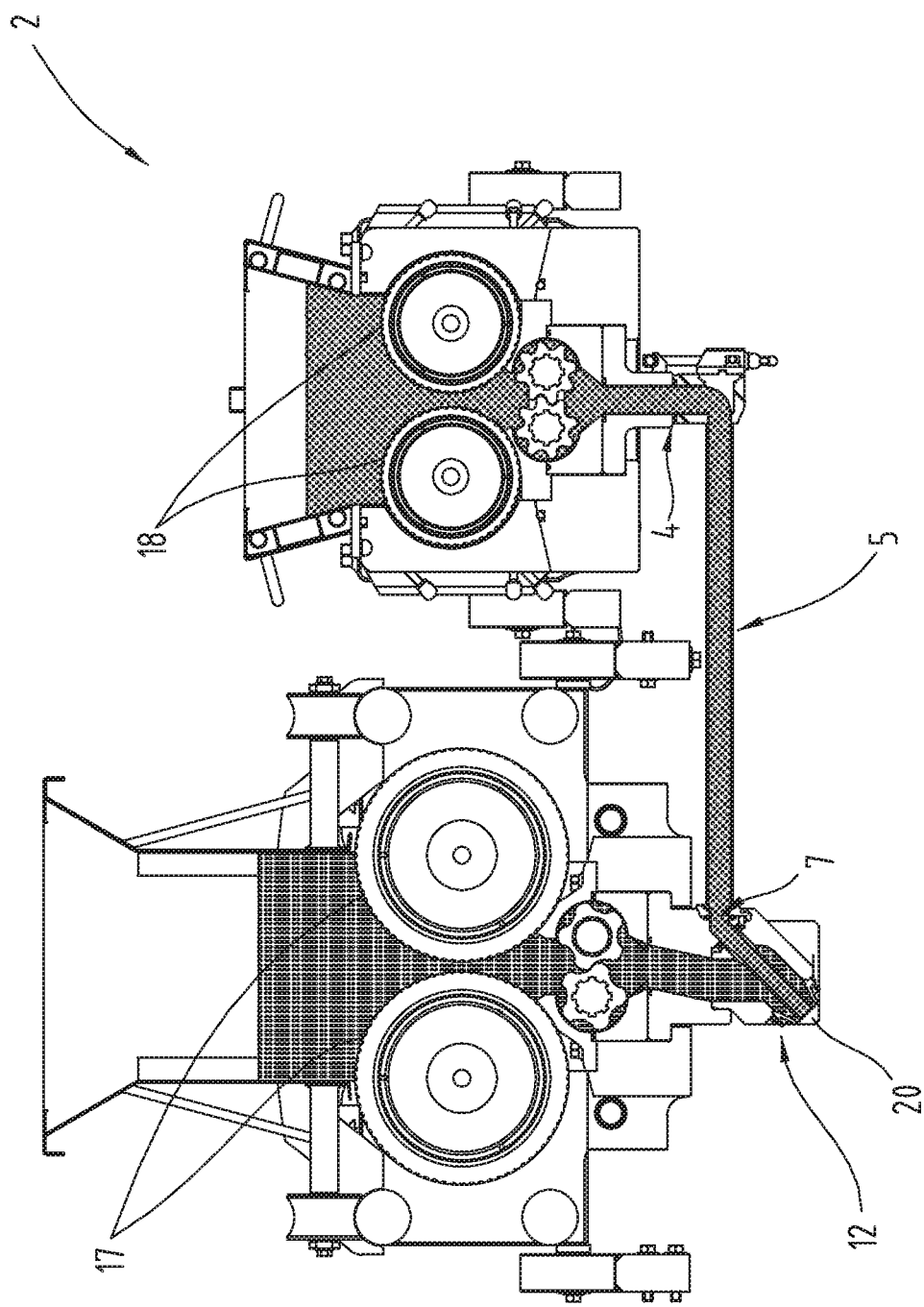
FIG. 2 shows the extrusion units in cross-sectional view.

Each of the extrusion units may further comprise a hopper (FIG. 1) or any other suitable dough supplying means. Each extrusion unit 1, 2 may comprise a pump housing below the feeding rollers 17, 18 (FIG. 2). The first extrusion unit 1 and the second extrusion unit 2 may be separately and independently of each other demounted from platform 3.

Figure 3:
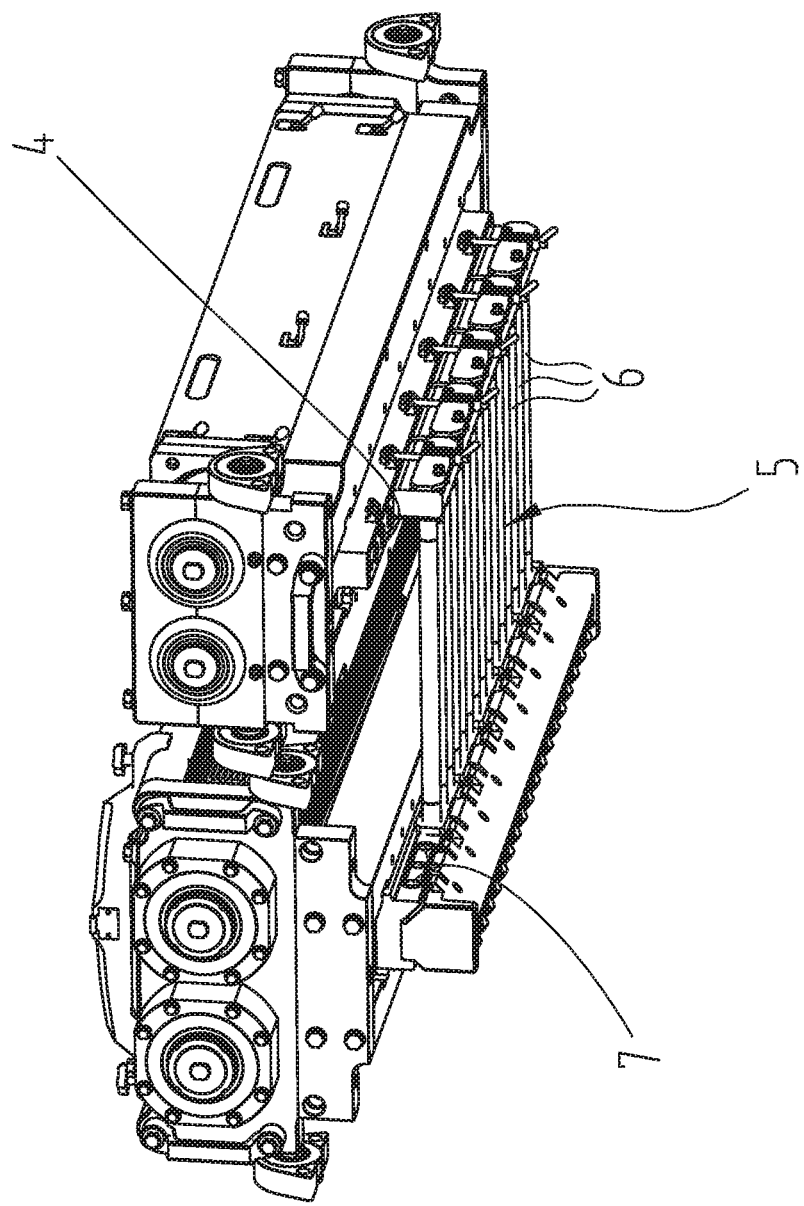
FIG. 3 shows in a perspective view the bottom side of the extrusion units with the tube array.

The first extrusion unit 1 has a plurality of inlet openings 7 upstream of combining means 12, and the second extrusion unit 2 has a plurality of outlet openings 4 (FIGS. 2 and 3). The outlet openings 4 of the second extrusion unit 2 are coupled to the inlet openings 7 of the first extrusion unit 1 by an array 5 of tubes 6 detachably mounted to the first and second extrusion unit 1, 2. The array of tubes is detachable from both extrusion units.

Each outlet opening 4 of the second extrusion unit 2 is coupled to a separate outlet nozzle 20. I.e. the plurality of individual dough flows passing the tube array are kept separated (are not mixed together anymore).

Figure 4:
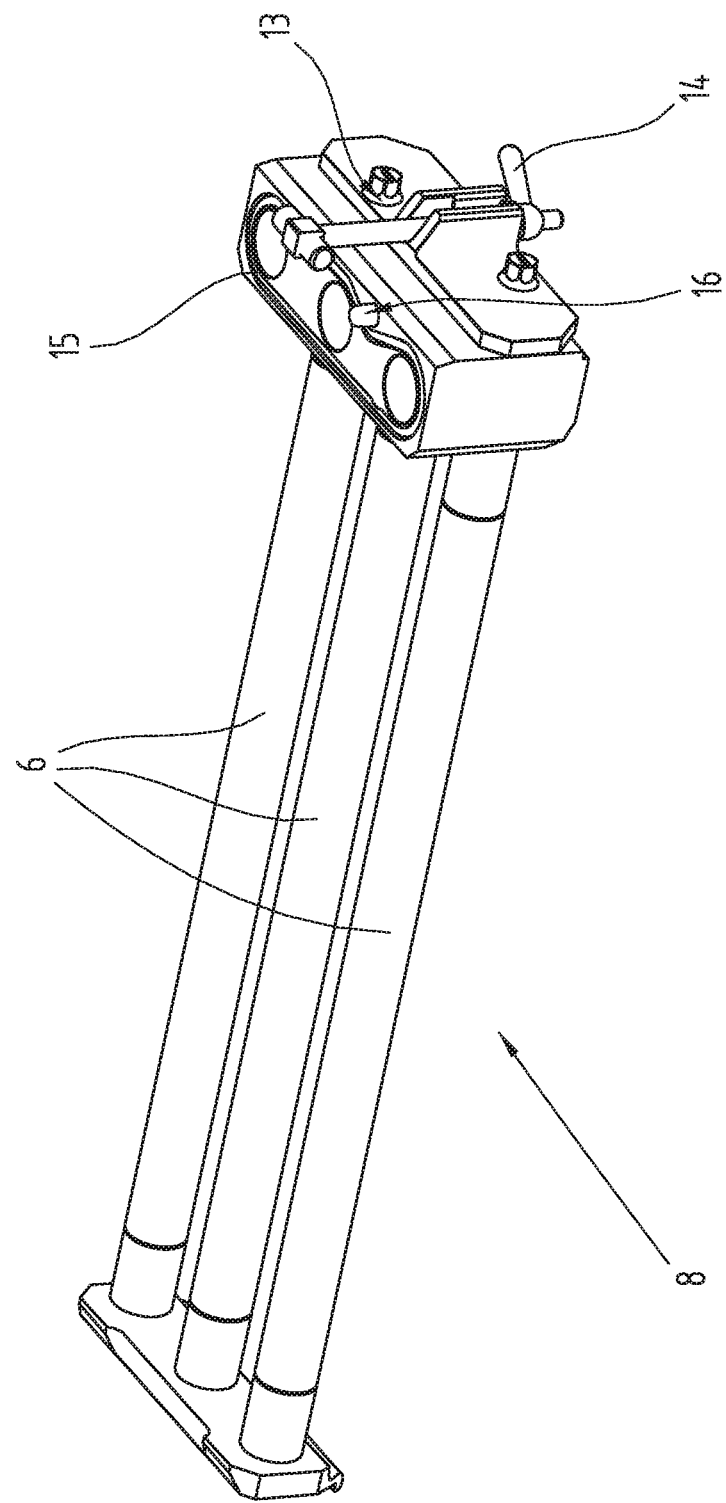
FIG. 4 shows a segment of the tube array.

In the present embodiment as shown in FIGS. 3 and 4 the array 5 of tubes 6 is formed from separate segments 8, wherein each segment 8 is detachable from the first and second extrusion unit 1, 2 independently of the other segments 8. It is preferred if a segment 8 comprises at least two (here: three) tubes 6 interconnected with each other, preferably at their ends.

Figure 5:
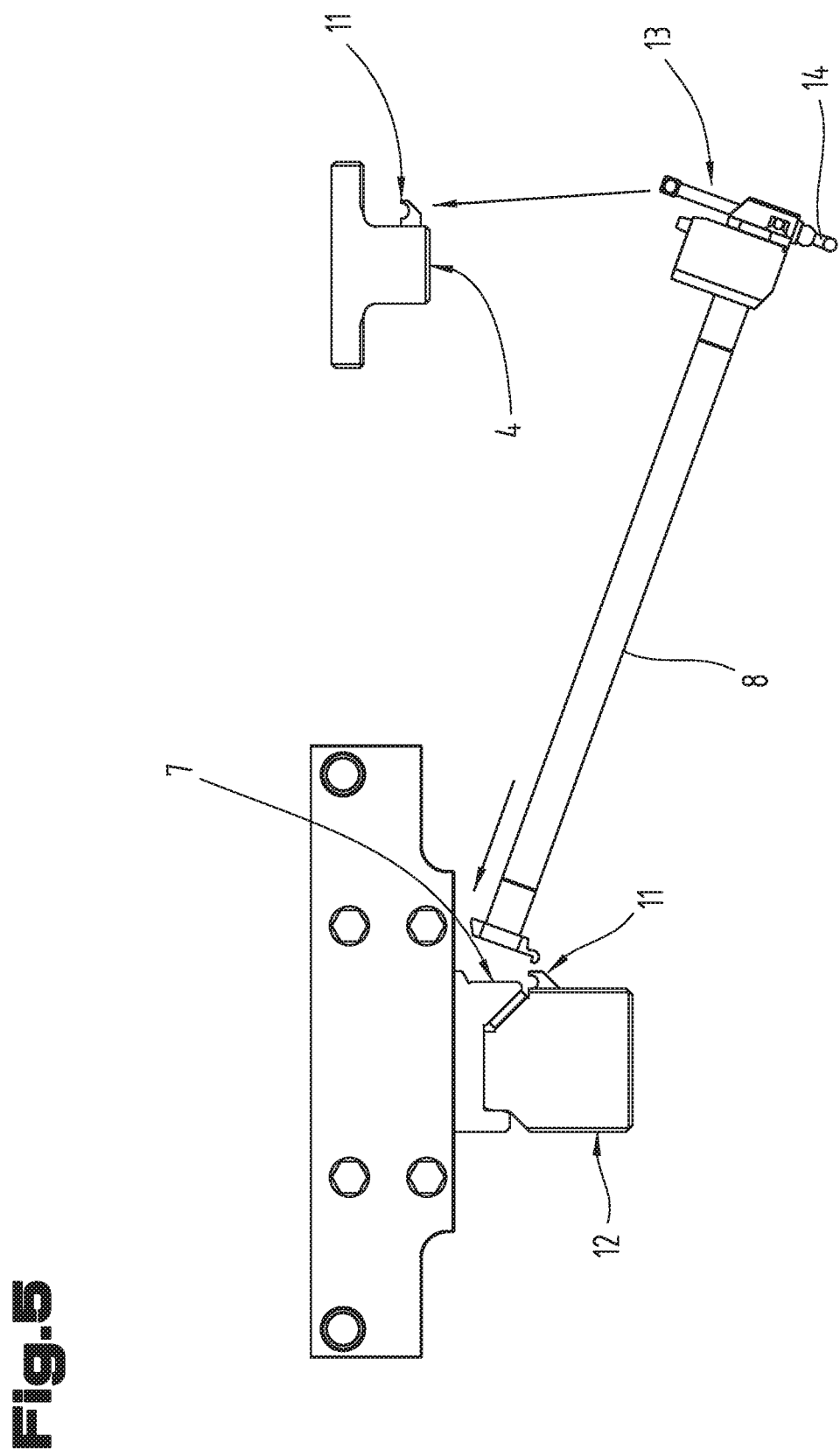
FIG. 5 shows the mounting of a segment.
Figure 6:
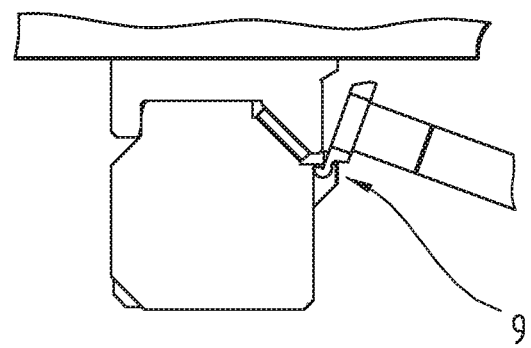
FIG. 6 shows the hinge between the first extrusion unit and the tubes.

As can be seen from FIGS. 5 and 6 the tubes 6 are connected to the first extrusion unit 1 via a hinge 9. The axis of the hinge 9 is essentially perpendicular to the longitudinal extension of the tubes 6. Each segment 8 has a (rounded)

projection which forms with a (correspondingly rounded) notch 11 of the first extrusion unit 1 a hinge 9. During assembling the projection of the segment 8 is inserted into the notch 11 (FIG. 5). Subsequently, the segment 8 with its other end is tilted upwardly and fixed to the second extrusion unit 2.

Figure 7:
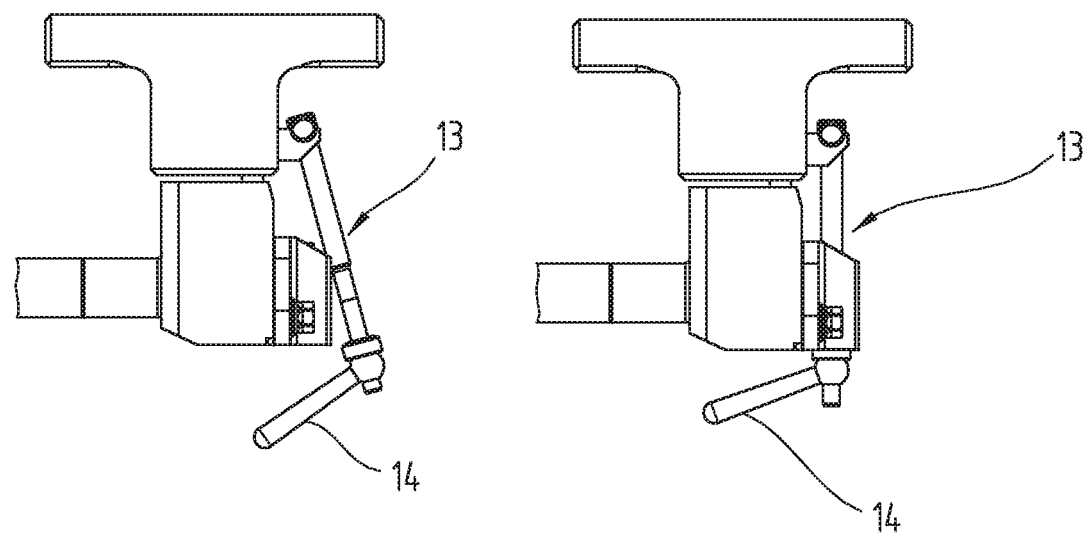
FIG. 7 shows the fastening mechanism to the second extrusion unit

As can be seen also from FIG. 7 the tubes 6 are connected to the second extrusion unit 2 via at least one fastening mechanism 13 (here: by means of a clamping mechanism comprising a fastening screw). The fastening mechanism has an integral handle 14, here in form of a turnable lever, for the operator. The fastening mechanism 13 cooperates with a notch 11 formed at the second extrusion unit 2.

As can be seen from FIG. 4 the array 5 of tubes 6 comprises sealing rings 15. Here, one sealing ring 15 encloses three tube openings.

The array 5 of tubes 6 comprises (here: for each segment 8) positioning means 16, preferably a positioning pin or positioning recess, cooperating with a positioning structure formed on the second extrusion unit 2. Similar positioning means may be provided in the end region facing the first extrusion unit 1.

The length of the tubes 6 is at least 5 times, preferably at least 8 times, larger than the vertical distance between the outlet openings 4 of the second extrusion unit 2 and the inlet openings 7 of the first extrusion unit 1.

The tubes 6 extend parallel to each other, preferably essentially horizontally. The tubes 6 have a straight run (facilitating cleaning), such that the axis of the tubes 6 lie within a single plane (place-saving).

The end openings of the tubes 6 facing the outlet openings 4 of the second extrusion unit 2 extend within a plane which is transverse, preferably essentially perpendicular, to the plane in which the end openings of the tubes 6 facing the inlet openings 7 of the first extrusion unit 1 extend.

Figure 8:
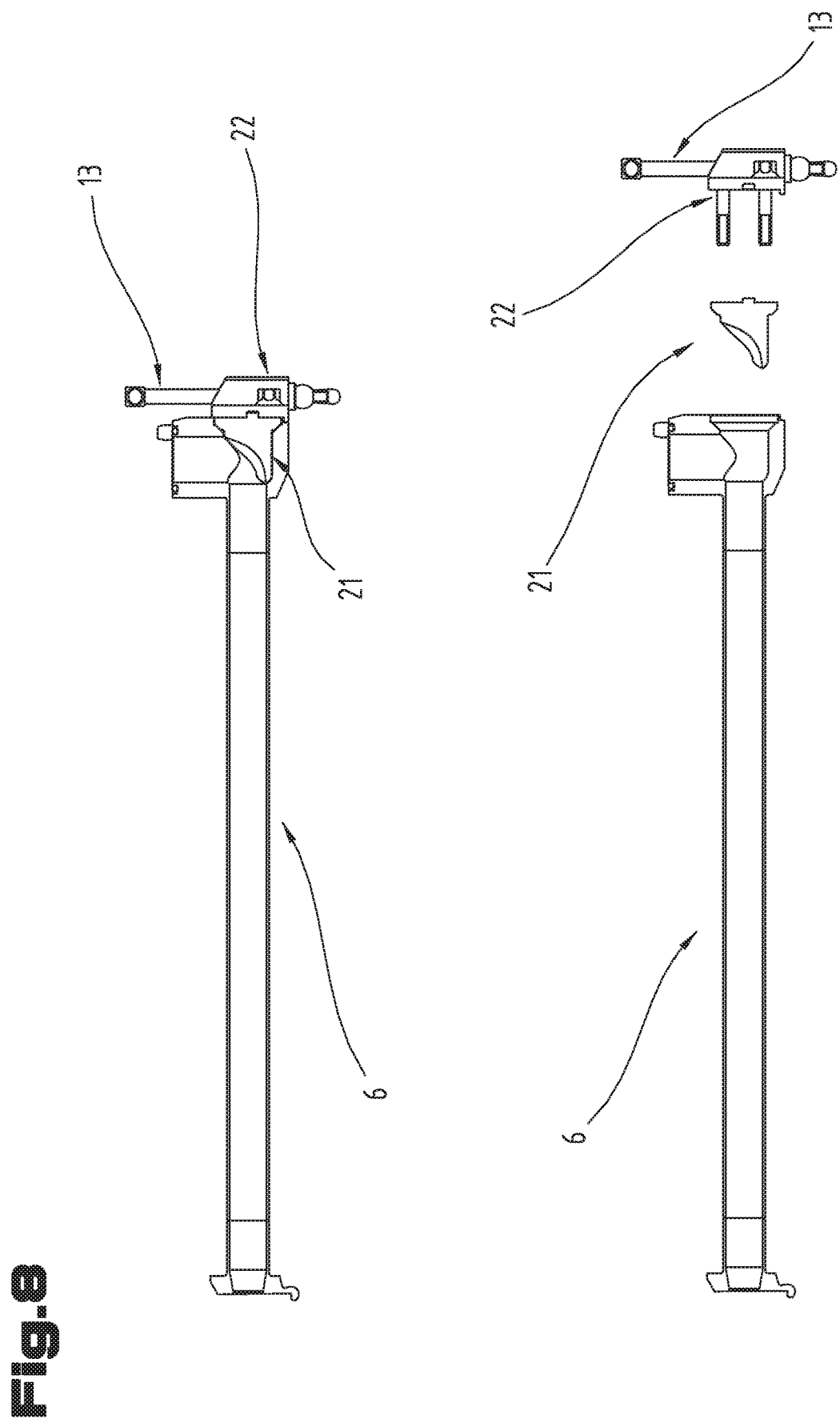
FIG. 8 shows constructional details of the tube array.

FIG. 8 shows constructional details of the tube array. In its end region facing the second extrusion unit 2 each tube 6 has an insert 21 defining a bent (here: of 90°) of the dough path. The insert 21 is fixed within the tube 6 by means of a plate 22. Plate 22 cooperates with the fastening mechanism 13.

The dough extrusion machine 10 further comprises a conveyor 19, preferably a belt, for transporting dough extruded by the first and second extrusion unit 1, 2. The array 5 of tubes 6 is arranged between the conveyor 19 and the extrusion units 1, 2.

The inventive machine is used to produce food products, particularly bakery products. It is particularly suitable for producing food products from two different dough qualities. Particularly, the dough supplied to the first extrusion unit 1 may have a higher density and/or viscosity than the dough supplied to the second extrusion unit 2.

It is noted that the invention is not limited to the embodiments disclosed hereinbefore, but combinations of the different variants are possible. In reality, the dough extrusion machine may have more or less parts than shown in the Figures. The machine and parts thereof may also be shown in different scales and may be bigger or smaller than depicted. Finally, the description may comprise subject matter of further independent inventions.

LIST OF REFERENCE SIGNS

1 first extrusion unit
2 second extrusion unit
3 platform
4 outlets of the second extrusion unit
5 array
6 tubes
7 inlets
8 segment
9 hinge
10 dough extrusion machine
11 notch
12 combining means
13 fastening mechanism
14 handle
15 sealing ring
16 positioning means
17 feed roller
18 feed roller
19 conveyor
20 outlet nozzle
21 insert
22 plate

The invention claimed is:

1. Food dough extrusion machine comprising: a first extrusion unit and a second extrusion unit mounted to a platform, wherein the first extrusion unit comprises combining means for combining dough discharged from the first extrusion unit and dough discharged from the second extrusion unit, characterized in that the first extrusion unit has a plurality of inlet openings upstream of combining means, and that the second extrusion unit has a plurality of outlet openings, wherein the plurality of outlet openings of the second extrusion unit are coupled to the plurality of inlet openings of the first extrusion unit by an array of tubes detachably mounted to the first and second extrusion units, wherein the array of tubes comprises a plurality of tubes.

2. Food dough extrusion machine according to claim 1, wherein the array of tubes is formed from at least two separate segments, wherein each segment comprises at least one tube of the plurality of tubes and wherein each segment is detachable from the first and second extrusion units independently of the other segment(s).

3. Food dough extrusion machine according to claim 2, wherein one of the at least two segments comprises at least two tubes of the plurality of tubes interconnected with each other.

4. Food dough extrusion machine according to claim 1, wherein the plurality of tubes is connected to one of the first and second extrusion units, via at least one hinge, wherein the axis of the hinge is perpendicular to the longitudinal extension of the plurality of tubes.

5. Food dough extrusion machine according to claim 1, wherein the plurality of tubes is connected to one of the first and second extrusion units, via at least one fastening mechanism, having an integral handle.

6. Food dough extrusion machine according to claim 1, wherein at least one of the first extrusion unit or the second extrusion unit comprise at least one notch supporting the plurality of tubes.

7. Food dough extrusion machine according to claim 1, wherein the array of tubes comprises sealing rings, wherein a sealing ring encloses at least one tube opening.

8. Food dough extrusion machine according to claim 1, wherein the array of tubes comprises at least one positioning means, cooperating with a positioning structure formed on at least one of the first extrusion unit or the second extrusion unit.

9. Food dough extrusion machine according to claim 1, wherein the length of the plurality of tubes is at least five times larger than the vertical distance between the plurality of outlet openings of the second extrusion unit and the plurality of inlet openings of the first extrusion unit.

10. Food dough extrusion machine according to claim 1, wherein the plurality of tubes extend parallel to each other, or wherein the plurality of tubes have a straight run, such that the axis of the plurality of tubes lie within a single plane.

11. Food dough extrusion machine according to claim 1, further comprising a conveyor for transporting dough extruded by the first and second extrusion units and wherein the array of tubes is arranged between the conveyor and the first and second extrusion units.

12. Food dough extrusion machine according to claim 1, characterized in that the first extrusion unit comprises two feeding rollers, wherein the combining means is arranged vertically below the gap formed between the feeding rollers of the first extrusion unit, and/or in that the second extrusion unit comprises two feeding rollers, wherein the plurality of outlet openings of the second extrusion unit are arranged vertically below the gap formed between the feeding rollers of the second extrusion unit.

13. Food dough extrusion machine according to claim 1, wherein the combining means is integrally formed within the first extrusion unit.

14. Food dough extrusion machine according to claim 1, wherein the first extrusion unit and the second extrusion unit are separately demountable from the platform.

15. Food dough extrusion machine according to claim 1, wherein the extrusion unit has a plurality of outlet nozzles through which the combined dough flow is discharged, wherein each outlet opening of the second extrusion unit is coupled to a separate outlet nozzle such that the plurality of individual dough flows passing the tube array are kept separated.

16. Food dough extrusion machine according to claim 1, wherein the first and second extrusion units have longitudinal extension, wherein the plurality of outlet openings of the second extrusion unit, the plurality of inlet openings of the first extrusion unit and dough outlet nozzles for discharging the combined dough flow are arranged along the longitudinal direction of the first and second extrusion units.

17. Food dough extrusion machine according to claim 1, wherein the combining means is formed within a combining block having the plurality of inlet openings, which are connected by the tube array with the plurality of outlet openings of the second extrusion unit, connection openings to the dough space of the first extrusion unit to the housing in which also feeding rollers are accommodated, and a combining passage or combining nozzle in which the different dough flows are brought together, wherein a plurality of nozzles are formed in the combining block through which the combined dough flow leaves the extruder.

18. Food dough extrusion machine according to claim 1, wherein the plurality of outlet openings of the second extrusion unit are formed within a block which is directly attached to or integrally formed with the housing in which feed rollers of the second extrusion unit are accommodated.

19. Food dough extrusion machine according to claim 3, wherein the plurality of tubes have a curved run.

20. Food dough extrusion machine according to claim 1, wherein the plurality of tubes are flexible and/or at least partially transparent.

21. Food dough extrusion machine according to claim 1, wherein the plurality of inlet openings of the first extrusion unit and the plurality of outlet openings of the second extrusion unit are arranged at different height levels.

22. Food dough extrusion machine according to claim 1, wherein the distance between neighbouring inlet openings of the plurality of inlet openings of the first extrusion unit is different than the distance between neighbouring outlet openings of the plurality of outlet openings of the second extrusion unit.

23. Food dough extrusion machine according to claim 1, wherein the second extrusion unit is mounted to the first extrusion unit.

24. Food dough extrusion machine according to claim 1, wherein the second extrusion unit is movably mounted relative to the first extrusion unit.

25. Food dough extrusion machine according to claim 2, wherein a segment (8) comprises at least two tubes interconnected with each other at their ends.

26. Food dough extrusion machine according to claim 1, wherein the first extrusion unit has a plurality of outlet nozzles through which the combined dough flow is discharged, wherein the plurality of outlet nozzles are a part of the combining means, wherein each outlet opening of the second extrusion unit is coupled to a separate outlet nozzle of the plurality of outlet nozzles, such that the plurality of individual dough flows passing the tube array are separated.

27. Food dough extrusion machine according to claim 1, further comprising a conveyor that transports dough extruded by the first and second extrusion units and having a dough transporting direction, wherein the first and second extrusion units have longitudinal extensions, wherein the plurality of outlet openings of the second extrusion unit, the plurality of inlet openings of the first extrusion unit and dough outlet nozzles for discharging the combined dough flow are arranged along a longitudinal direction of the first and second extrusion units, with the first and second extrusion units extending transverse to the transporting direction of the conveyor.

28. Food dough extrusion machine according to claim 1, wherein the plurality of inlet openings of the first extrusion unit and the plurality of outlet openings of the second extrusion unit are arranged at different height levels, wherein the plurality of outlet openings of the second extrusion unit are arranged on a higher level than the plurality of inlet openings of the first extrusion unit.

29. Method of producing food products comprising supplying dough to a food dough extrusion machine according to claim 1, wherein the dough supplied to the first extrusion unit has at least one of a higher density or a higher viscosity than the dough supplied to the second extrusion unit.

30. Food dough extrusion machine according to claim 1, which is configured for producing bakery products.

* * * * *